United States Patent
Casali et al.

(10) Patent No.: US 9,439,521 B2
(45) Date of Patent: Sep. 13, 2016

(54) ANGLED HOOK AND LOCKING CONNECTOR FOR PEG AND SLAT BOARD

(71) Applicant: The Display Connection, Inc., Moonachie, NJ (US)

(72) Inventors: Joseph Casali, Franklin Lakes, NJ (US); Stephen Calabrese, Leonia, NJ (US)

(73) Assignee: THE DISPLAY CONNECTION, INC., Moonachie, NJ (US)

( * ) Notice: Subject to any disclaimer, the term of this patent is extended or adjusted under 35 U.S.C. 154(b) by 0 days.

(21) Appl. No.: 14/704,368

(22) Filed: May 5, 2015

(65) Prior Publication Data

US 2015/0320239 A1 Nov. 12, 2015

Related U.S. Application Data

(60) Provisional application No. 61/990,617, filed on May 8, 2014.

(51) Int. Cl.
*A47F 5/08* (2006.01)
*A47F 5/00* (2006.01)
*F16M 13/02* (2006.01)

(52) U.S. Cl.
CPC ........... *A47F 5/0823* (2013.01); *A47F 5/0006* (2013.01); *A47F 5/0853* (2013.01); *A47F 5/0861* (2013.01); *F16M 13/02* (2013.01); *F16M 13/022* (2013.01); *Y10T 29/49828* (2015.01)

(58) Field of Classification Search
CPC .. A47F 5/0823; A47F 5/0846; A47F 5/0861; A47F 5/0869; B25H 3/04
See application file for complete search history.

(56) References Cited

U.S. PATENT DOCUMENTS

| | | | | | |
|---|---|---|---|---|---|
| 3,319,917 | A | * | 5/1967 | Bilodeau | A47F 5/0823 248/220.43 |
| 4,303,217 | A | * | 12/1981 | Garfinkle | A47F 5/0823 248/220.42 |
| 4,351,440 | A | * | 9/1982 | Thalenfeld | A47F 5/0853 211/57.1 |
| 4,436,209 | A | * | 3/1984 | Thalenfeld | A47F 5/0853 211/57.1 |
| 4,474,300 | A | * | 10/1984 | Entis | A47F 5/0861 211/4 |
| 4,506,856 | A | * | 3/1985 | Rich | A47F 5/0823 248/220.31 |
| 5,109,992 | A | * | 5/1992 | Miller | A47F 5/0823 211/59.1 |
| 8,746,472 | B2 | * | 6/2014 | Thrush | F16M 13/02 211/94.01 |

* cited by examiner

*Primary Examiner* — Rodney Mintz
*Assistant Examiner* — Daniel Kenny
(74) *Attorney, Agent, or Firm* — Michael J Feigin, Esq.; Feigin & Fridman

(57) ABSTRACT

A connector having a plurality of prongs at each end. The prongs can be inserted into portals, such as those of slat board. The connector can be locked in place by angling the prongs into the portals and connecting two parts of the connector to each other, such as by a male and female connector, which lock and affix in place, requiring a tool to remove. A connector arm can also be attached to the connector, extending outwards, such as at an acute angle, to the connector. On this arm, an extension arm can be further attached. Either the connecting arm or extension arm can have portals for a hook or an integrated hook from which merchandise can be hung. Each of the connecting arm, connector, and extension arm can be reversibly or removably attached one to the other by way of a depressible button on one device extending through a portal of another.

16 Claims, 13 Drawing Sheets

ANGLED HOOK AND LOCKING CONNECTOR FOR PEG AND SLAT BOARD

FIELD OF THE DISCLOSED TECHNOLOGY

The disclosed technology relates generally to connectors, and, more specifically, to a hook for a display using a pegboard, grid board, or slat wall (parallel linear recesses adapted to receive a hook).

BACKGROUND OF THE DISCLOSED TECHNOLOGY

Slat board and peg board are common types of walls or other rigid structures to which hooks are attached. In this manner, in home use as well as especially in retail stores, hooks are positioned on walls by way of extending prongs of the hooks through or into the walls. Standard hooks known in the art extend perpendicularly to the generally flat and elongated side of the wall which works well, except that the hooks are in a single orientation, which can be limiting. Items hung from the hooks, in order to be visible, are often then perpendicular to the hooks (or parallel to the wall). Thus, items hung from the wall, especially cards and the like, take up maximum room. More options are needed in the art to hang items from a wall.

Another problem with the current state of the art hooks used with peg board and slat board is that the hooks can easily be removed. In retail environments, a thief can remove the hook with all the merchandise hanging therefrom. Further, the hooks have to be of sufficient height so children don't run into them and knock them out of the wall (and possibly get hurt). This further limits usage of such hooks and leaves a store prone to a less than desirable look, as hooks go missing from walls, or fall and remain on the ground. Therefore, it is also needed and desirable in the art to have a hook which can be removed at any time, but remains in place when desired by the installer or owner of a location using such hooks.

Therefore, the disclosed technology sets out to further the state of the art by providing a hook which allows for more flexibility in the way items can be hung from slat, peg, or other types of board and is also more strongly attached than that of the prior art.

SUMMARY OF THE DISCLOSED TECHNOLOGY

A connector having a plurality of prongs at each end. The prongs can be inserted into portals, such as those of slat board. The connector can be locked in place by angling the prongs into the portals and connecting two parts of the connector one to the other, such as by both a male and a female connector, which remain locked and affixed in place, with a tool required for their removal. A connector arm can also be attached to the connector, extending outwards, such as at an acute angle, to the connector. On this arm, an extension arm can be further attached. Either the connecting arm or the extension arm can have portals for a hook or an integrated hook from which merchandise can be hung. Each of the connecting arm, connector, and extension arm can be reversibly or removably attached to one another by way of a depressible button on one device extending through a portal of another.

In some embodiments, a first pair of fixed-positioned spaced-apart prongs extends substantially transverse to a generally planar surface of a connector. A living hinge having at least two positions is formed in the connector. The two positions can include a first position, where a second pair of spaced-apart prongs is substantially co-planar with the generally planar surface, and a second position where the second pair of spaced-apart prongs extends substantially transverse to the generally planar surface.

The first pair of fixed-positioned spaced-apart prongs can further have a portion thereof which extends parallel to the generally planar surface of the connector, and where the portion thereof forms a unitary structure with the substantially transverse portion of the first pair of prongs. The connector can further have a depressible button which, in a resting position, extends past the generally planar surface of the connector. The connector can have flanges on either side of the connector, and the depressible button is fixedly positioned in a position spaced apart from the generally planar surface of said connector. A connecting arm with a portal sized to receive (defined as "larger than, but by no more than 10% in diameter the device which fits there-in) the depressible button there-in. Upon the depressible button engaging with the portal, a generally planar portion of the connecting arm is positioned between each two flanges on either side of the connector and the generally planar surface of the connector.

In some embodiments, the connector has a male portion and a female portion. The male portion of an affixable connector (a connector which can be affixed, as defined in the "detailed description") is on a first side of the (living) hinge, and the female portion is on a second side of the (living) hinge. Here, "on a side" (first or second) is defined as "relative to each other," such that the hinge is between each of the male and female portions of the affixable connector. In the second position, the male portion and the female portion are affixed to each other. The affixed male portion and the female portion require the use of a tool beyond bare hands of an average person, in order to be removed from each other, in embodiments of the disclosed technology.

In the second position, each prong of the first pair of spaced-apart prongs and the second pair of spaced-apart prongs can be fixed in position in a slat board or peg board.

In some embodiments, the connector has a hinge bisecting two parts of the connector. The two parts of the connector are connected by the hinge, and can be further connected by way of a second connection formed by rotating the hinge, such that each of the two parts is rotated to meet the other and then connect, forming a triangle. The second connection can create a fixed connection. Spaced-apart first prongs fixedly attached to one part of the two parts of the connector can rotate with the rotating of the hinge. The spaced-apart first prongs can be movable, by way of said movement of the hinge, between a position which is flush with each of the two parts of the connector and a position which is perpendicular to at least one part of the two parts of the connector.

A second set of prongs on the connector attached to the connector at an opposite side of the hinge and/or the connector from the first set of prongs can also be used. Each of the first and second prongs can be engaged with slat board or peg board and fixedly held there-in until the hinge of the second connection is broken. The hinge can be a living hinge repeatedly bendable between an unbent and an at least 90 degree bent condition.

In a method of using the afore-described connectors, one can insert at least two spaced-apart prongs into slat board or peg board, then depress a portion of the connector towards itself, causing the extreme ends of at least two additional spaced-apart prongs to rotate away from the connector.

Then, at least two additional spaced-apart prongs can be inserted into slat board or peg board. Two portions of the connector are then locked (fixedly attached) to one another, forcing the at least two additional spaced-apart prongs to be held in a position rotated away from the connector and in the slat board or the peg board.

The method can also include a step of sliding a connecting arm between a generally flat side of the connector and flanges spaced apart from (but fixedly attached to) the connector. The "generally flat side" of the connector is the side which also abuts the slat board or the peg board (on the side reverse to that of the flanges, depressible button, and direction of rotation of the hinge when creating the second connection and triangle region of the connector. The step of depressing can further involve rotating a living hinge, causing a portion of the connector which was planar with the generally flat side of the connector to be at an acute angle there-to.

An elongated length of rigid material can be inserted between a portion of the connector extending at an acute angle to the generally flat side of the connector and the generally flat side of the connector (herein, also defined as the "triangle") in order to detach the two portions of the connector from one another.

"Substantially" and "substantially shown," for purposes of this specification, are defined as "at least 90%," or as otherwise indicated. Any device may "comprise" or "consist of" the devices mentioned here-in, as limited by the claims.

It should be understood that the use of "and/or" is defined inclusively, such that the term "a and/or b" should be read to include the sets: "a and b," "a or b," "a," "b."

DETAILED DESCRIPTION OF EMBODIMENTS OF THE DISCLOSED TECHNOLOGY

Embodiments of the disclosed technology include a connector having a plurality (two or more) of prongs at each end (such as top and bottom sides, where a "side" is defined as 50% of the length thereof). The prongs can be inserted into portals, such as those of slat board (having elongated portals) or peg board (having circumscribed portals). The connector can be locked in place by angling the prongs into the portals and connecting two parts of the connector to each other, such as by a male and a female connector, which lock and affix in place, requiring a tool to remove. The two parts of the connector can be rotated towards each other about a hinge, such as a living hinge. A connector arm can also be attached to the connector, extending outwards, such as at an acute angle, to the connector. On this arm, an extension arm can be further attached. Either the connecting arm or the extension arm can have portals for a hook, or an integrated hook from which merchandise (items) can be hung. Each of the connecting arm, connector, and extension arm can be reversibly or removably attached to one another by way of a depressible button on one device extending through a portal of another.

Embodiments of the disclosed technology will become clearer in view of the following discussion of the figures.

Figure 1:
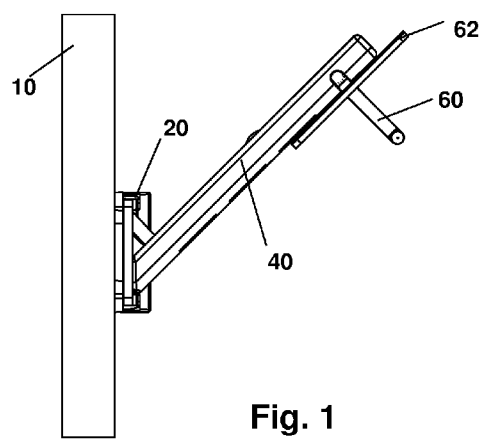
FIG. 1 shows a top view of the angled hook attached to slat wall, in an embodiment of the disclosed technology.
Figure 2:
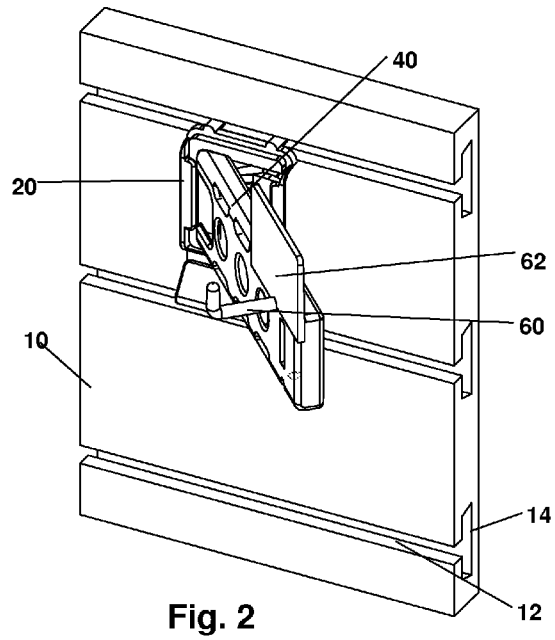
FIG. 2 shows a perspective view of the angled hook attached to slat wall of FIG. 1.
Figure 3:
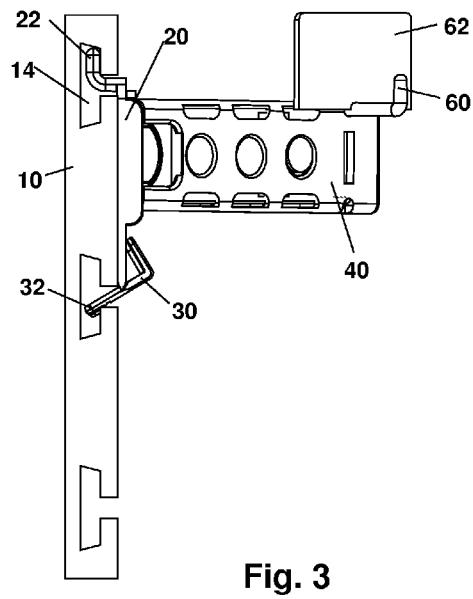
FIG. 3 shows an elevation view of the angled hook attached to slat wall of FIG. 1.
Figure 4:
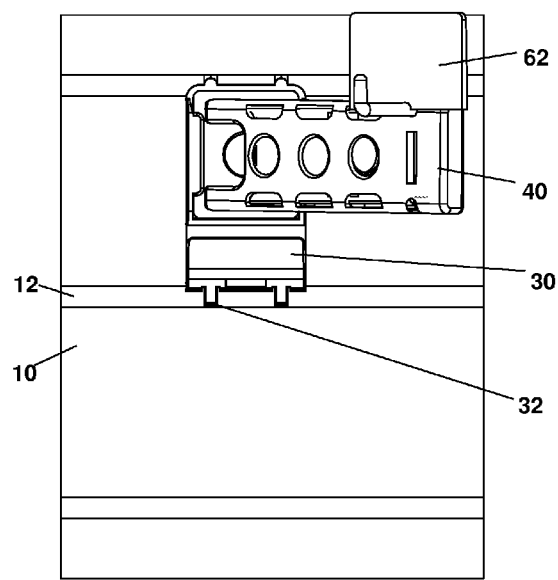
FIG. 4 shows a front view of the angled hook attached to slat wall of FIG. 1.

Referring to FIGS. 1 through 4 together, FIG. 1 shows a top view of the angled hook attached to slat wall, in an embodiment of the disclosed technology. FIG. 2 shows a perspective view of the angled hook attached to slat wall of FIG. 1. FIG. 3 shows an elevation view of the angled hook attached to slat wall of FIG. 1. FIG. 4 shows a front view of the angled hook attached to slat wall of FIG. 1. Here, a slat board 10 or slot board is shown having a plurality of parallel slots 12 with an interior T-shaped space 14 designed for attachment of pegs there-in. A connector piece 20 with top pegs 22 and bottom pegs 32 connects into the slots 12, going into the T-shaped interior 14. In this manner, the connector piece 20 is attached to the slat board. The connector piece 20 has, in embodiments of the disclosed technology, a living hinge section 30, which will be described further below with reference to other figures. The living hinge section 30, when bent relative to the upper portion of the connector piece 20 and slot board, changes the angle of the lower pegs 32. Attached to the connector piece 20 is an arm which is in turn covered by an extension piece 40, in embodiments of the disclosed technology. The arm and/or extension piece 40 have a slot or other connection mechanism for placement of a hook 60 and backing 62. The hook 60 can be used to hold merchandise, such as a card, cardboard backing, or packaging of a product, while the backing 62 can be used as a backstop for the merchandise, holding it in place.

Figure 5:
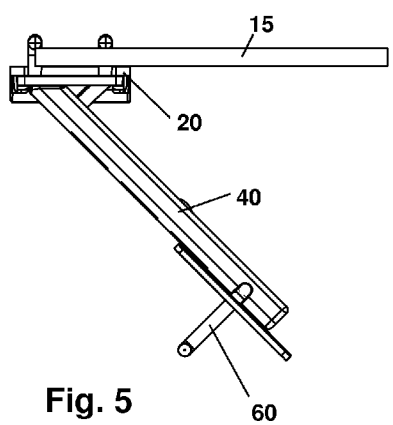
FIG. 5 shows a top view of the angled hook attached to peg board in an embodiment of the disclosed technology.
Figure 6:
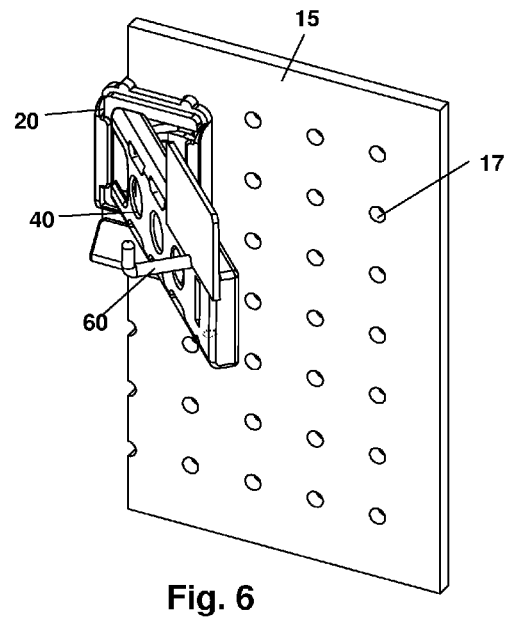
FIG. 6 shows a perspective view of the angled hook attached to peg board of FIG. 5.
Figure 7:
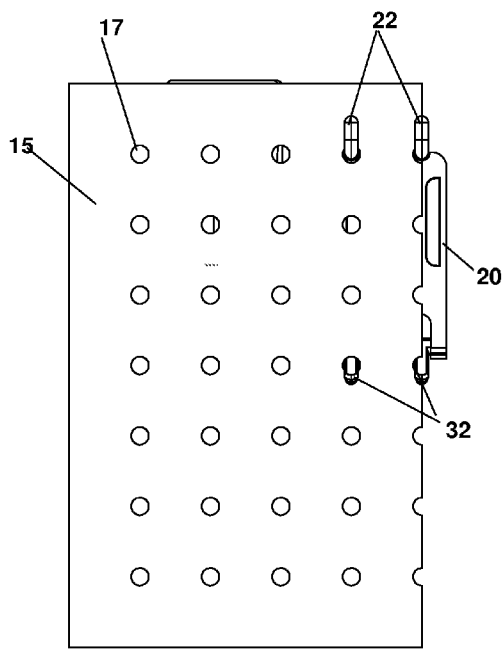
FIG. 7 shows a rear view of the angled hook attached to peg board of FIG. 5.
Figure 8:
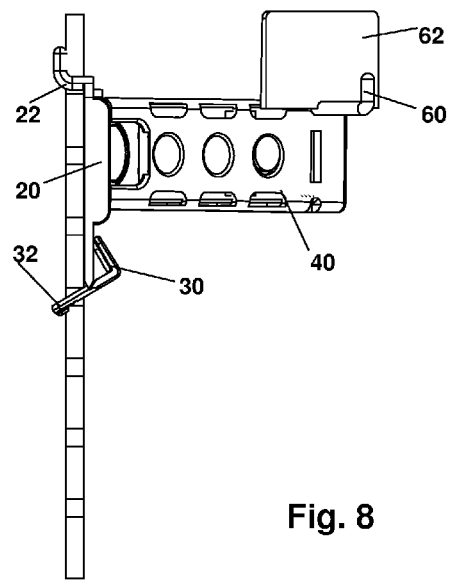
FIG. 8 shows an elevation view of the angled hook attached to peg board of FIG. 5.

FIGS. 5-8 show the angled hook used in connection with slot board. FIG. 5 shows a top view of the angled hook attached to peg board, in an embodiment of the disclosed technology. FIG. 6 shows a perspective view of the angled hook attached to peg board of FIG. 5. FIG. 7 shows a rear view of the angled hook attached to peg board of FIG. 5. FIG. 8 shows an elevation view of the angled hook attached to peg board of FIG. 5. Here, peg board 15, a planar board with spaced-apart portals, is shown in conjunction with the angled hook, comprising the connector piece 20. The angled hook can also have an extension arm 40, hook 60, and backing 62. As shown, the upper pegs 22 and lower pegs 32 can extend through the peg board. When the living hinge 30 is closed, pegs 22 and 32 are angled in substantially opposite directions or angles, locking the connector 20 into the peg board 15 (or slot board 10). This is due to the locked position of the pegs and their opposite angles, relative to an imaginary plane which is perpendicular to the plane of the board 10 or 15.

Figure 9:
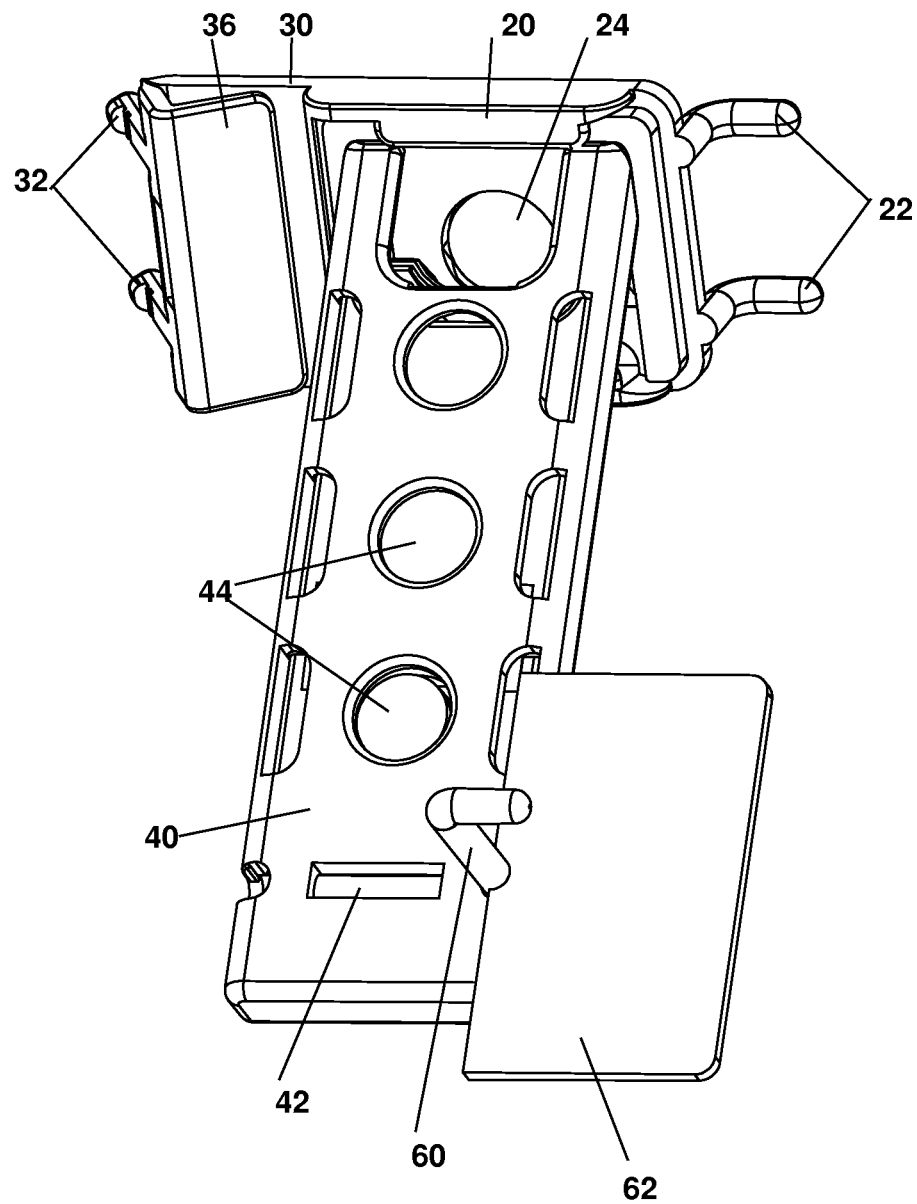
FIG. 9 shows a perspective view of an assembled angled hook in a first shortest comparative position, in an embodiment of the disclosed technology.

FIG. 9 shows a perspective view of an assembled angled hook in a first, shortest comparative position, in an embodiment of the disclosed technology. Here, the extension arm 40 is placed entirely over the length of an arm situated underneath (arm 50, visible in the subsequent figures). As such, the distance from the board (slot or peg) to the hook 60 is also the distance from the connector 20 to the slot 42, the slot 42 being adapted to receive the hook 60. In this embodiment, the slot 42 can extend through both the connecting arm 50 and the extending arm 40. Push button locks 44 can be used to hold the extension arm 40 to the connecting arm 50. Likewise, a push button lock 24 can be used to hold the arm 50 to the connecting piece 20.

A push button lock is defined as one which has at least two positions, one where the button is flush or substantially flush with a surrounding plane, and another where the button extends past the surrounding plane. In a resting position, the push button is in the second position, extending past the surrounding plane. When pushed with force applied transverse to the top plane of the button, it enters, or can enter, the first position, allowing another device to slide past and connect/disconnect by way of the button holding, or releasing from such holding, another object that has a portal which surrounds, or previously surrounded, the button.

Figure 10:
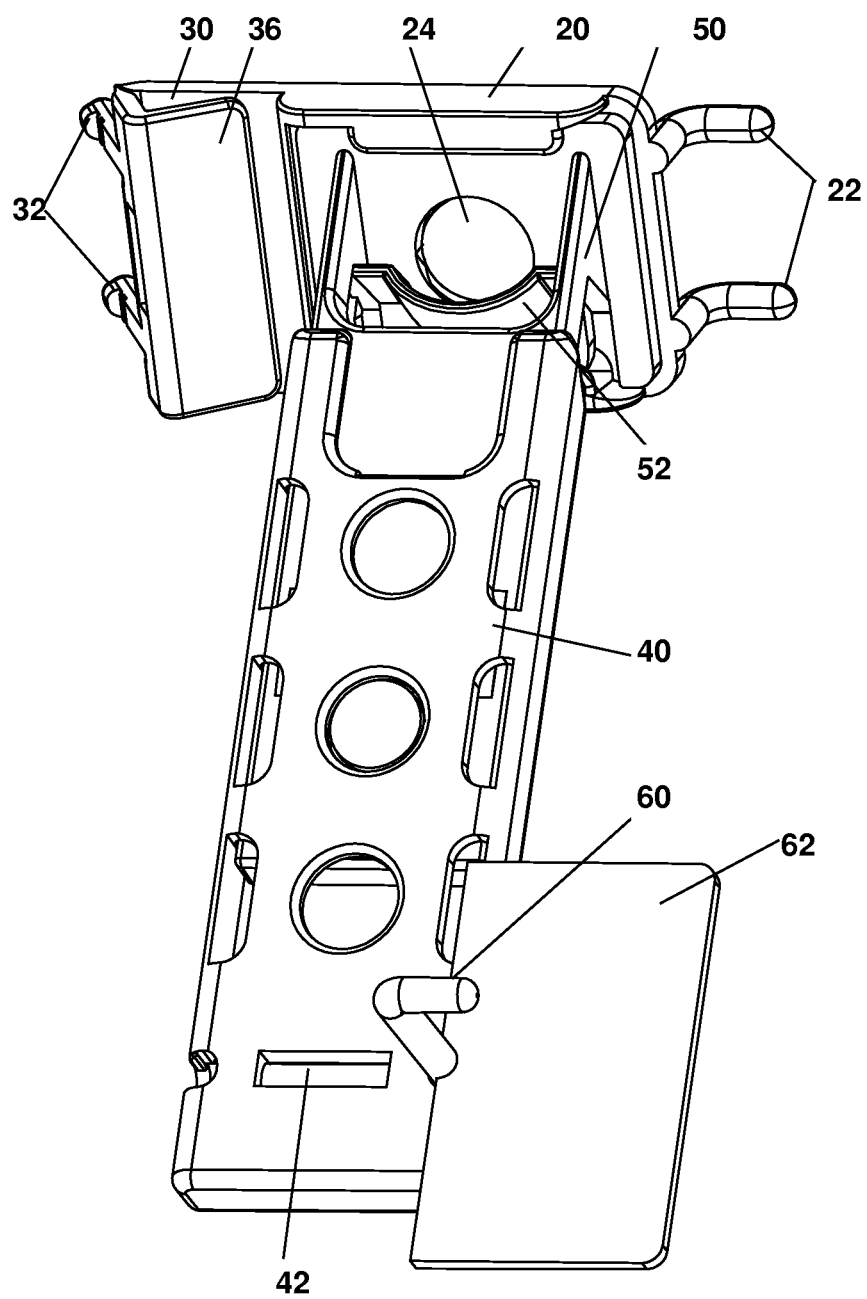
FIG. 10 shows a perspective view of an assembled angled hook in a medium comparative position, in an embodiment of the disclosed technology.

FIG. 10 shows a perspective view of an assembled angled hook in a medium comparative position, in an embodiment of the disclosed technology. Here, the push-button locks are used to hold the extension arm 40 further out from the connecting arm 50, by way of using only two of the three push-button locks on the connecting arm 50. It should be understood that any connecting mechanism can be used, reversible or irreversible, and any number of push-button locks can be used. An angled piece 52 of the arm 50 extends from a base of the connecting arm, which sits flush with an exterior side of the connector 20, in embodiments of the disclosed technology. In this manner, the connecting arm extends at an angle to the board on which the connector 20 is attached, in embodiments of the disclosed technology.

The living hinge 30 is also visible in this figure, having a top angled portion 36 which acts as a stop when the living hinge is fully in a closed position. A male portion of the living hinge engages with a female portion to lock it in place, as will be described with reference to subsequent figures.

Figure 11:
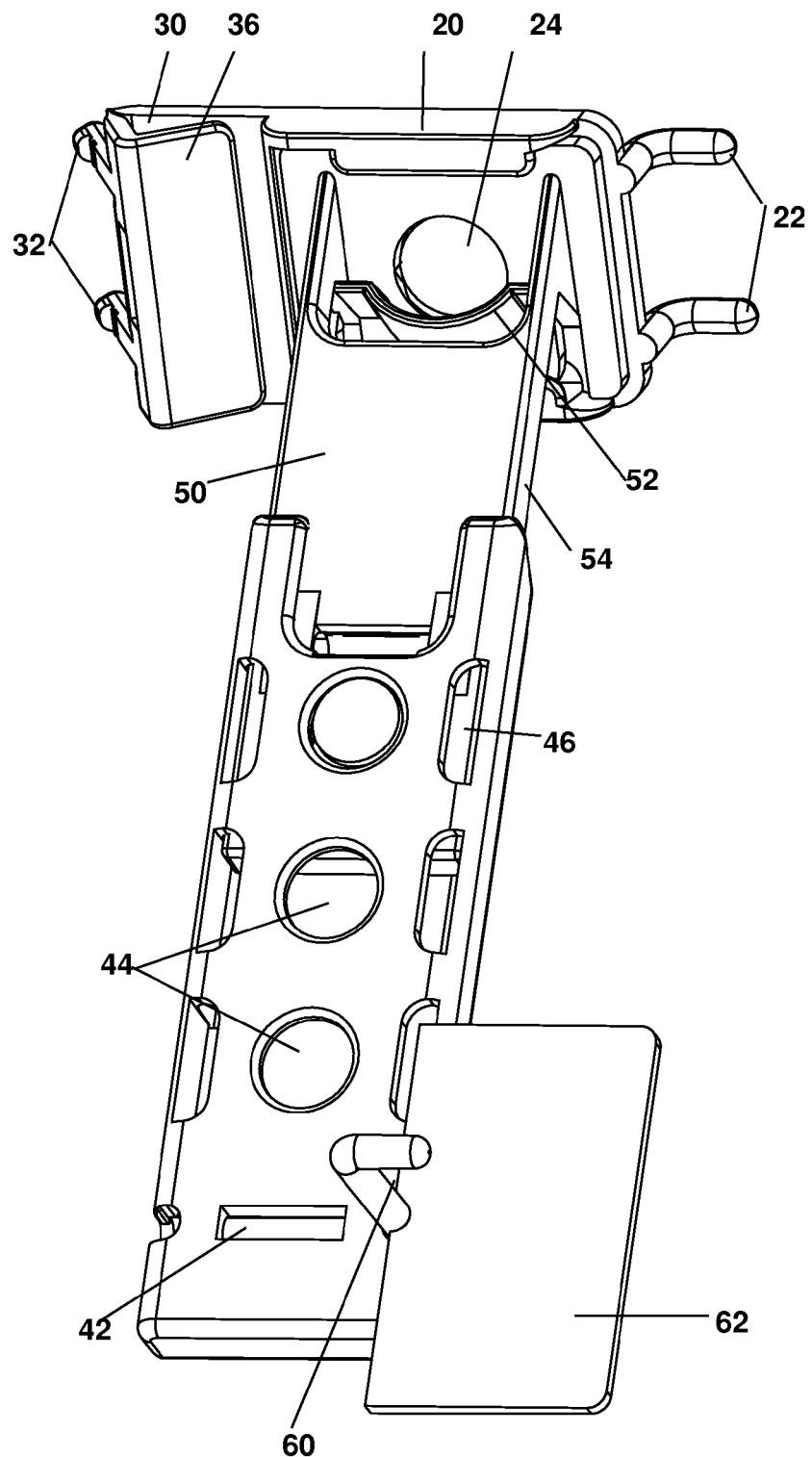
FIG. 11 shows a perspective view of an assembled angled hook in a longest comparative position, in an embodiment of the disclosed technology.

FIG. 11 shows a perspective view of an assembled angled hook in a longest comparative position, in an embodiment of the disclosed technology. Here, the connecting arm 50 is most visible having a top side 52, and a base side which can have a portal for placement of a locking button 24. The connecting arm 50 can also slide across and hold to flanges of the connector 20, in embodiments of the disclosed technology. Here, as can be seen, only one locking button of the connecting arm 50 engages with the extension arm 40, which has portals 44 for locking buttons, as well as portals 46.

Figure 12:
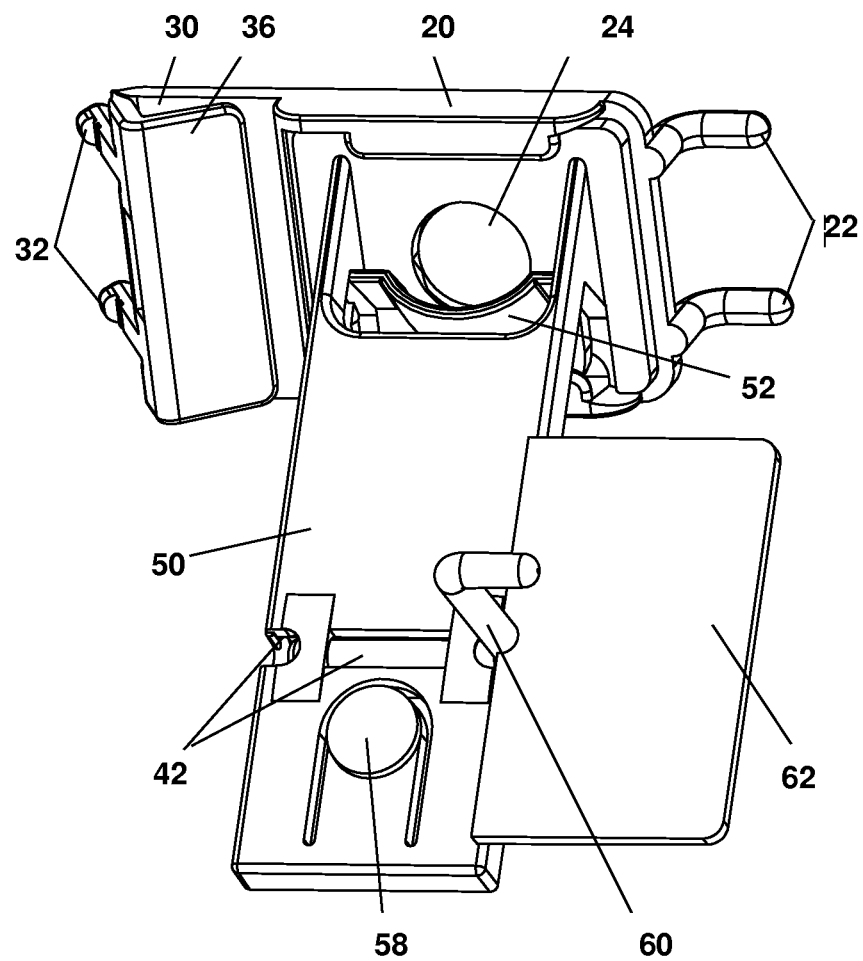
FIG. 12 shows a perspective view of an assembled angled hook without an extension arm, in an embodiment of the disclosed technology.

FIG. 12 shows a perspective view of an assembled angled hook without an extension arm, in an embodiment of the disclosed technology. In this embodiment, the extension arm 40 is not used. Instead, the hook 60, which can be used in connection with the backing 62 to hold merchandise, is placed directly into a portal 42 of the connecting arm 50. The connecting arm button 58 remains available for use to connect to another device, but is unconnected in this embodiment. As such, the hook 60 is relatively close to the connector 20, compared to embodiments which use the extension arm 40, allowing the hook to be placed further away from the board 10 or 15.

Figure 13:
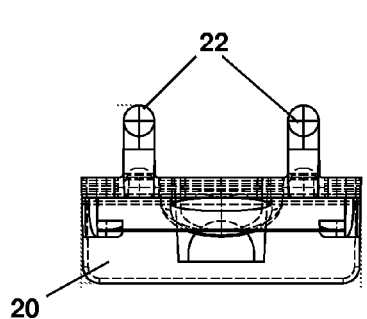
FIG. 13 shows a top view of a connector piece of the angled hook in an embodiment of the disclosed technology.
Figure 14:
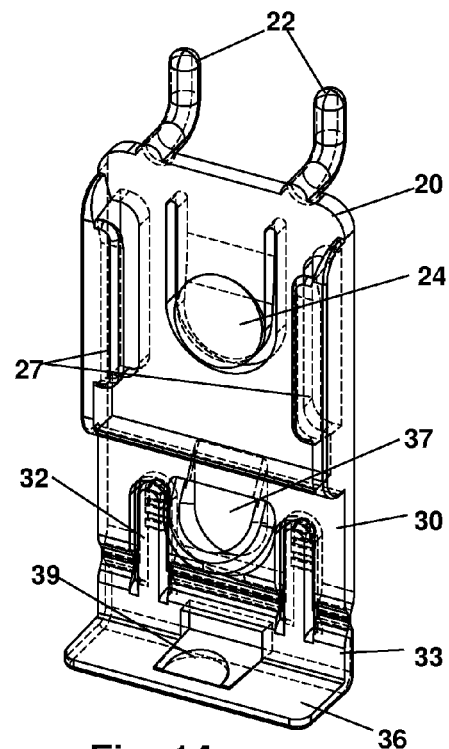
FIG. 14 shows a perspective view of the connector piece of FIG. 13.
Figure 15:
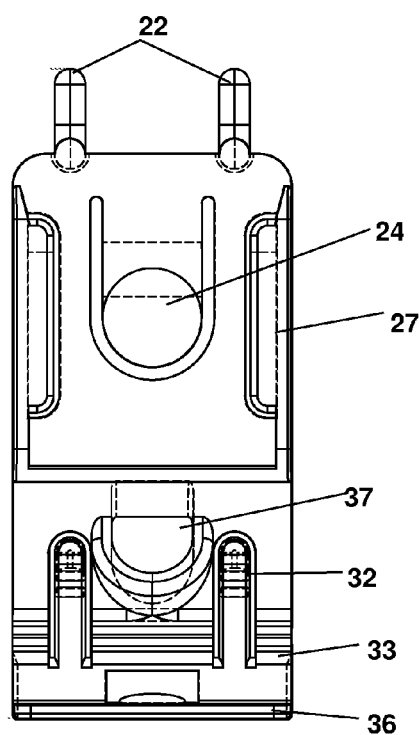
FIG. 15 shows a front view of the connector piece of FIG. 13.
Figure 16:
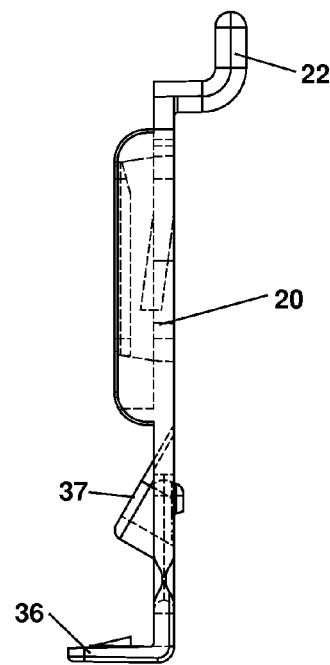
FIG. 16 shows a side view of the connector piece of FIG. 13.

Referring now to the elements of the connector piece 20, FIGS. 13 through 16 will be described. FIG. 13 shows a top view of a connector piece of the angled hook, in an embodiment of the disclosed technology. FIG. 14 shows a perspective view of the connector piece of FIG. 13. FIG. 15 shows a front view of the connector piece of FIG. 13. FIG. 16 shows a side view of the connector piece of FIG. 13. The connector piece has an upper portion and lower portion. The lower portion is defined by a living hinge 33 which bends, being the connecting piece between the end stop portion 36 with a male connector and a female portion 37 of the connector. When the end stop portion 36 is bent towards the female portion 37, the living hinge 33 folds to accommodate the bending action. The living hinge 33 can be a thin flexible hinge (flexure bearing) made from the same material as the two rigid pieces it connects, though it should be understood that any hinge can be used in embodiments of the disclosed technology. When fully bent, the male portion, such as a circular or semi-circular disc extending out from the end stop 36, latches into the female portion 37. The female portion can be in the form of a circular portal and can be raised or angled with respect to the elongated connector.

The connector 20 can have flanges 27 on either side which hold an arm or other device there-in, further connecting by way of the pushable button 24 or other connecting mechanisms which hold the connector 20 to another device. An attachment arm, such as arm 50, can be slid between the elongated back side of the connector 20 (the rounded rectangular part, as shown in FIGS. 14 and 15) and the flanges 27 in any of four orientations, each 90 degrees or 180 degrees off from each other orientation. In this manner, the connecting arm can face any of four directions, extending out from the connector 20.

Figure 17:
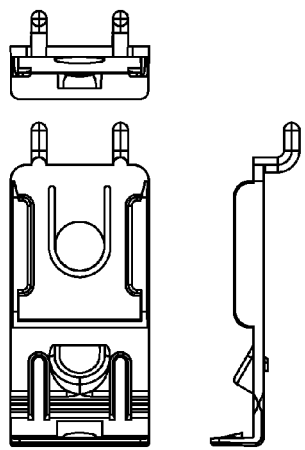
FIG. 17 shows various views of the connector piece with an open hinge, of an embodiment of the disclosed technology.
Figure 18:
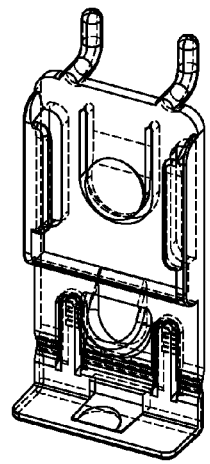
FIG. 18 shows a perspective view of the connector of FIG. 17.
Figure 19:
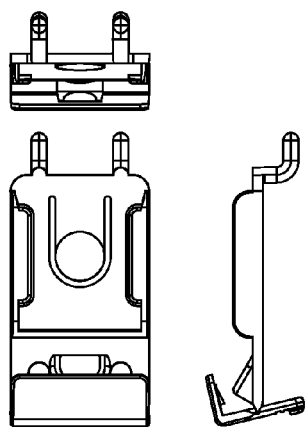
FIG. 19 shows various views of the connector piece with the hinge being closed, in an embodiment of the disclosed technology.
Figure 20:
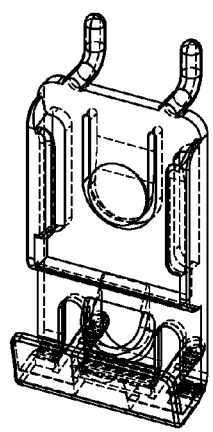
FIG. 20 shows a perspective view of the connector of FIG. 19.
Figure 21:
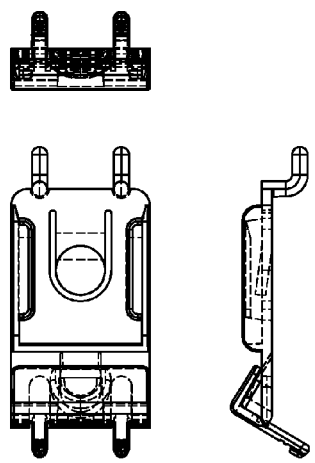
FIG. 21 shows various views of the connector piece with the hinge in a closed position, in an embodiment of the disclosed technology.
Figure 22:
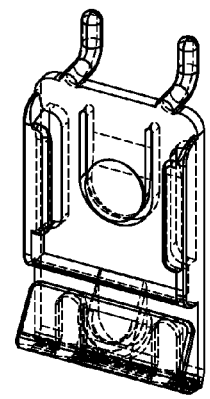
FIG. 22 shows a perspective view of the connector of FIG. 21.

FIGS. 17 through 22 show views of the connector piece 20 as the lower portion is unlocked, being locked, and locked in place. FIG. 17 shows various views of the connector piece with an open hinge, of an embodiment of the disclosed technology. FIG. 18 shows a perspective view of the connector of FIG. 17. These views are similar to that shown in FIGS. 13-16 with the lower portion open. FIG. 19 shows various views of the connector piece with the hinge being closed, in an embodiment of the disclosed technology. FIG. 20 shows a perspective view of the connector of FIG. 19. In these views, the lower portion is tiled, such that the prongs (32) exit from the elongated plane of the connector (20/30) and the lower-most portion (36) folds upwards, with the male connector approaching the female connector (37). FIG. 21 shows various views of the connector piece with the hinge in a closed position, in an embodiment of the disclosed technology. FIG. 22 shows a perspective view of the connector of FIG. 21. Here, the female and male portions on the lower part (30) of the connector are affixed to each other. "Affixed," for purposes of this disclosure, is defined as "not movable with respect to the connected parts without the aid of tools or force, which causes an average person trying to remove such connected parts from each other with bare fingers pain that might deter the average person from continuing."

Figure 23:
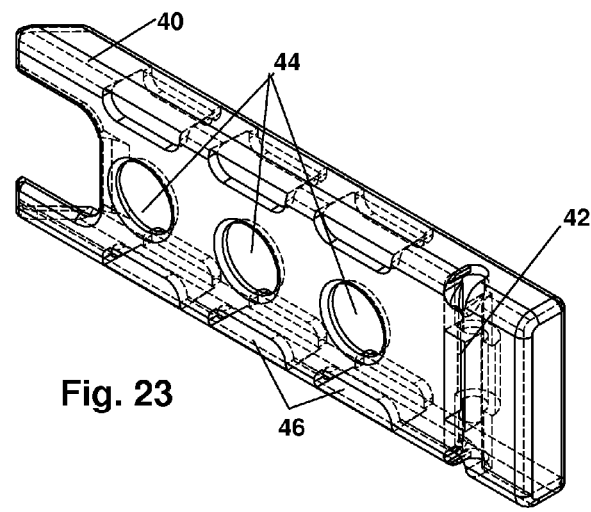
FIG. 23 shows a perspective view of an extension piece used with embodiments of the disclosed technology.
Figure 24:
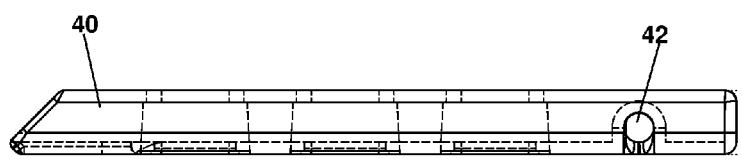
FIG. 24 shows a top view of the extension piece of FIG. 23.
Figure 25:
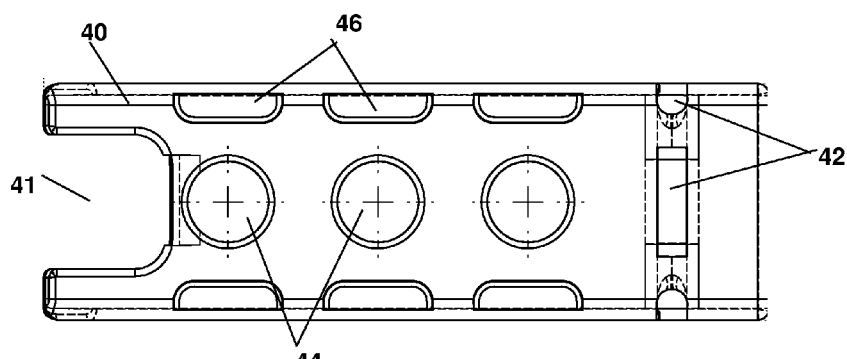
FIG. 25 shows an elevation view of the extension piece of FIG. 23.

FIGS. 23 through 25 show views of the extension arm 40. FIG. 23 shows a perspective view of an extension piece used with embodiments of the disclosed technology. FIG. 24 shows a top view of the extension piece of FIG. 23. FIG. 25 shows an elevation view of the extension piece of FIG. 23. This extension arm has a plurality of portals 44 which pass through the device, adapted to receive a pushable button. When the pushable button is extended through one of the portals 44, it holds the extension arm 40 in place. By placing the pushable button through one of the three portals 44, one can adjust the distance that the extension arm reaches from the peg or slat board. It should be understood that, while three portals 44 for a pushable button to pass through or partially through are shown, any number can be used, such as one, two, three, four, five, six, eight, ten, or twelve. In addition, other methods of mechanisms for attaching two items to each other in a removable (readily detachable without the use of tools) or irremovable (requires special tools or breakage of the item to remove) manner are part of the scope of the disclosed technology.

The extension arm also can have a vertical portal 42 for passage there-through of a wire, pipe, metal post, or other length of rigid material, such as a hook 60. Further, a cutaway area 41 can be used to reduce the weight of the extension arm 40 and allow for attachment at either side of the cutaway area to another device, such as the connecting arm 50.

Figure 26:
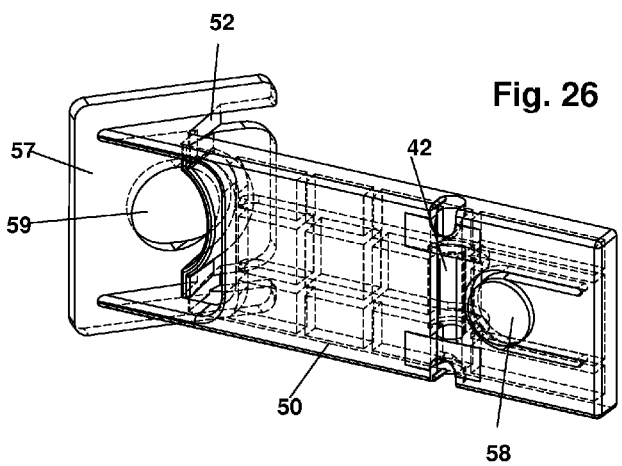
FIG. 26 shows a perspective view of a connector piece and arm attached to each other, in an embodiment of the disclosed technology.
Figure 27:
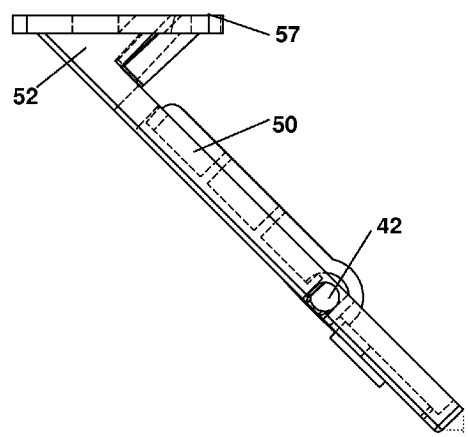
FIG. 27 shows a top view of the connector piece and arm attached to each other of FIG. 26.
Figure 28:
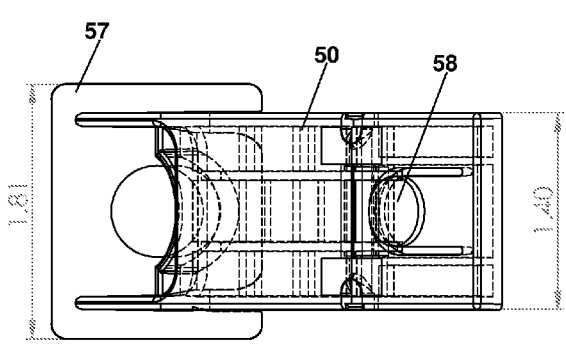
FIG. 28 shows a front view of the connector piece and arm attached to each other of FIG. 26.
Figure 29:
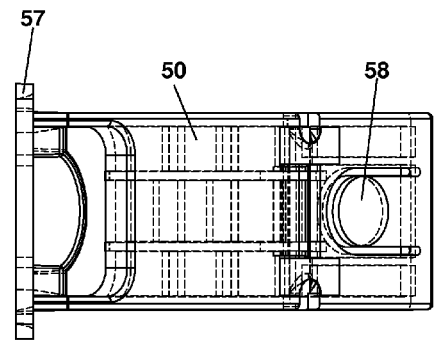
FIG. 29 shows a side view of the connector piece and arm attached to each other of FIG. 26.

The connecting arm 50 is shown by itself in FIGS. 26 through 29. FIG. 26 shows a perspective view of a connector piece and arm attached each other, in an embodiment of the disclosed technology. FIG. 27 shows a top view of the connector piece and arm attached to each other of FIG. 26. FIG. 28 shows a front view of the connector piece and arm attached to each other of FIG. 26. FIG. 29 shows a side view of the connector piece and arm attached to each other of FIG. 26. The connecting arm can have a portal 59 for passage there-through of a push button. The push button can be connected by deformable plastic which when bent, returns back to the original position such that another object with portal can pass over the button, and the button, and the button can return to it's original position, this time being in a portal of the object. The elongated flat connecting region 57 can be placed and held against the flanges 27 and backing of the connector 20. An angled support 52 extends from the flat region 57 at an acute angle (or obtuse on the other side thereof) to a length of material extending outwards and forming, as shown, the majority of the connecting arm 50. The connecting arm further has a male side of a pushable button 58, which engages with one of the portals 44 of the extension arm 40, in embodiments of the disclosed technology.

Or, when the extension arm 40 is not used, a hook or other post (as described in the preceding paragraphs) can be placed in the vertical portal 42. The vertical portal 42 can align with/be the same as the portal on the extension arm 40, or can be a separate vertical portal. In a shortest configuration from the peg or slat board to the hook 60, the extension arm is not used, and the connecting arm, as shown in FIGS. 26 through 29, can be the only device between the connector 20 and hook 60.

Figure 30:
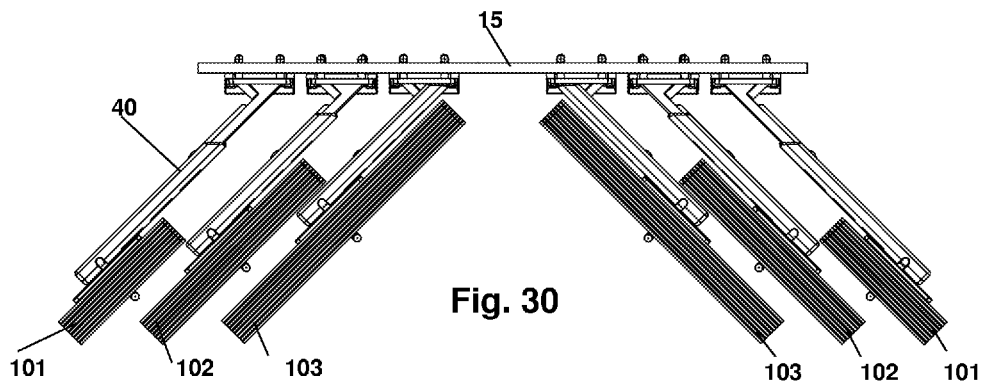
FIG. 30 shows a top view of a plurality of angled hooks attached to peg board, in an embodiment of the disclosed technology.
Figure 31:
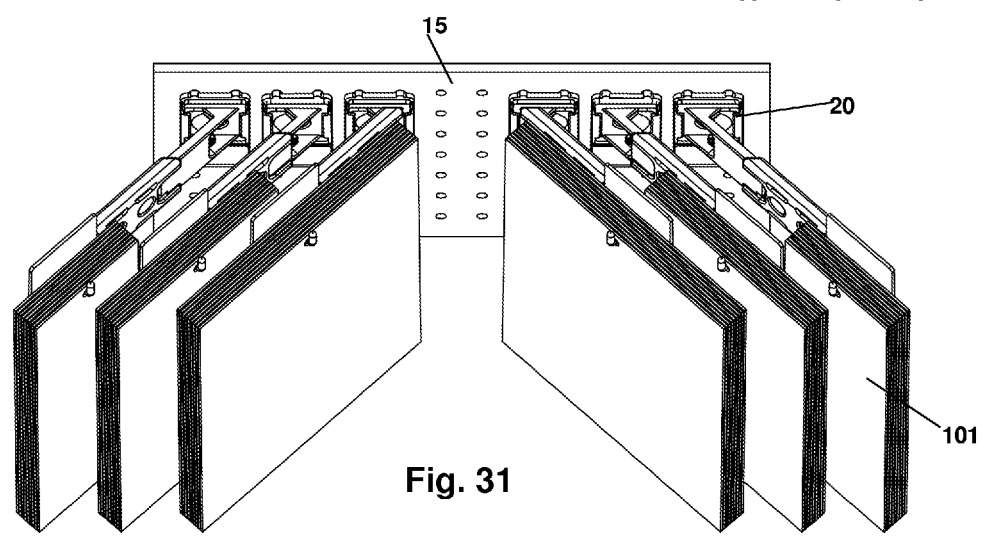
FIG. 31 shows a perspective view of a plurality of angled hooks attached to peg board, in an embodiment of the disclosed technology.
Figure 32:
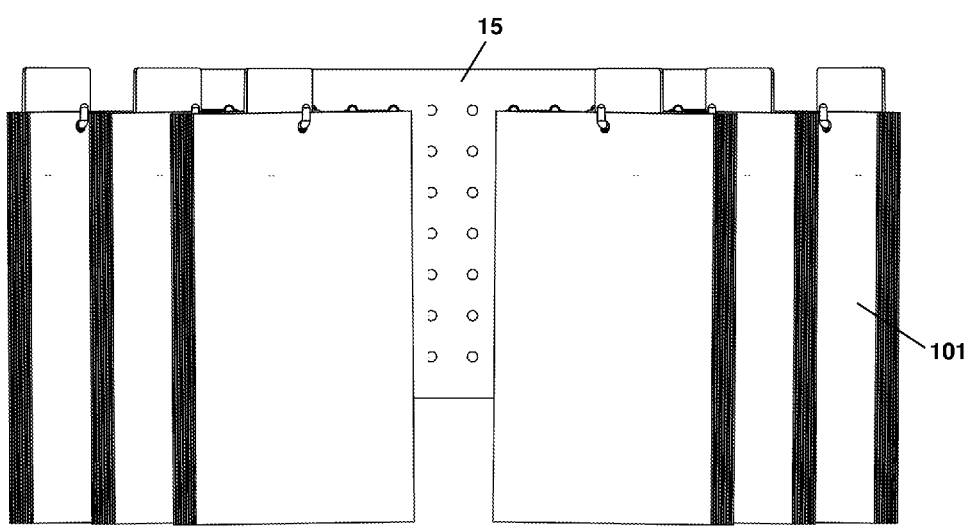
FIG. 32 shows a front view of a plurality of angled hooks attached to peg board, in an embodiment of the disclosed technology.

Multiple angled hook devices can be used in conjunction. FIGS. 30 through 32 show same in use with peg board 15. FIG. 30 shows a top view of a plurality of angled hooks attached to a peg board, in an embodiment of the disclosed technology. FIG. 31 shows a perspective view of a plurality of angled hooks attached to peg board, in an embodiment of the disclosed technology. FIG. 32 shows a front view of a plurality of angled hooks attached to peg board, in an embodiment of the disclosed technology. Here, multiple connectors 20 with pegs extend through the peg board 15 with three different widths of items for sale 101, 102, and 103 attached there-to.

In this example, item 101 has a first shortest width and, therefore, has an extension arm extending furthest, such as is shown in FIG. 11. Item 102 has a second middle width (compared to items 101 and 103) and, therefore, the extension arm 40 is extended less far than that of the extension arm corresponding with item 101. This may be, for example, the extension arm in the position shown in FIG. 10 with the second portal 44 having the pushable button extending there-through. Finally, item 103 is the widest (compared to the other items 101 and 102) and, as such, the extension arm is at its shortest position; or the extension arm is not used, and the item 103 is on a hook, the hook attaching directly to the connecting arm 30 (as shown, for example, in FIG. 6).

In this manner, items 101, 102, and 103, though having different widths, extend the same distance from the peg board, creating a uniform and neat appearance. Such a "uniform" or "neat" appearance is defined as having an equal distance from, or substantially equal distance from, peg board/slot board to the furthest extent of an item displayed which is hooked on to a hook (such as hook 60) of the angled hook device.

Further, it can be seen in FIGS. 30, 31, and 32 that the connecting arms 30 (as numbered in other figures) can be in opposite directions. That is, relative to the plan of the pages for each of these figures, some of the connecting arms extend from the connector 20 towards the right, and others towards the left. In this manner, mirrored or opposite configurations can be created with products facing in the same direction or opposite directions (towards each other). When facing in the "opposite direction," this is defined as having the same absolute value of the angle offset from perpendicular to the elongated, substantially flat, side of the peg board 15 or slat board 10.

Figure 33:
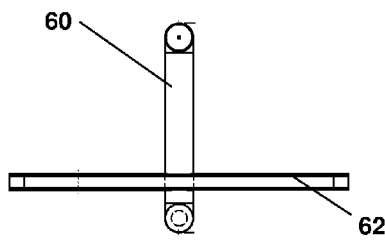
FIG. 33 shows a top view of a backing and hook used in embodiments of the disclosed technology.
Figure 34:
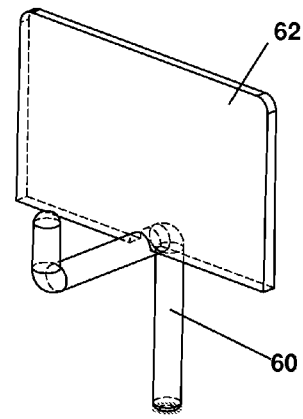
FIG. 34 shows a perspective view of the backing and hook of FIG. 33.
Figure 35:
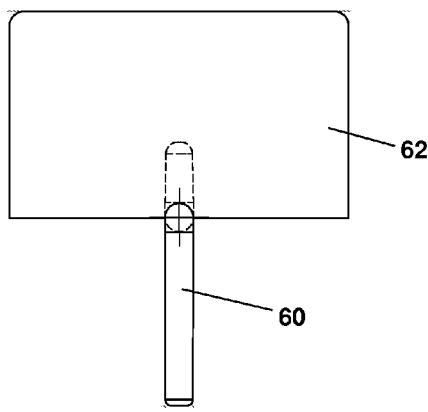
FIG. 35 shows a front elevation view of the backing and hook of FIG. 33.
Figure 36:
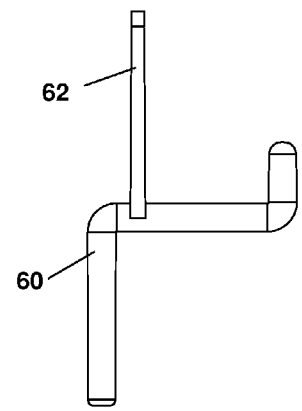
FIG. 36 shows a side elevation view of the backing and hook of FIG. 33.

FIGS. 33 through 36 show a backing and hook which can be used in embodiments of the disclosed technology. FIG. 33 shows a top view of a backing and hook used in embodiments of the disclosed technology. FIG. 34 shows a perspective view of the backing and hook of FIG. 33. FIG. 35 shows a front elevation view of the backing and hook of FIG. 33. FIG. 36 shows a side elevation view of the backing and hook of FIG. 33. Here, the backing 62 can be used to provide a stop or backstop for which items displayed or hung from the hook 60 hit against, to prevent their further movement on the hook. That is, an item is hung based on passage of the top end of the hook 60 (relative to the direction of the hook 60 in FIG. 36) through a portal on the item. The item then rests on the lateral/horizontal portion of the hook 60 (again, referring to the direction of the hook 60 as shown in FIG. 36), and is stopped from falling to the lower vertical portion by the backing 62.

Figure 37:
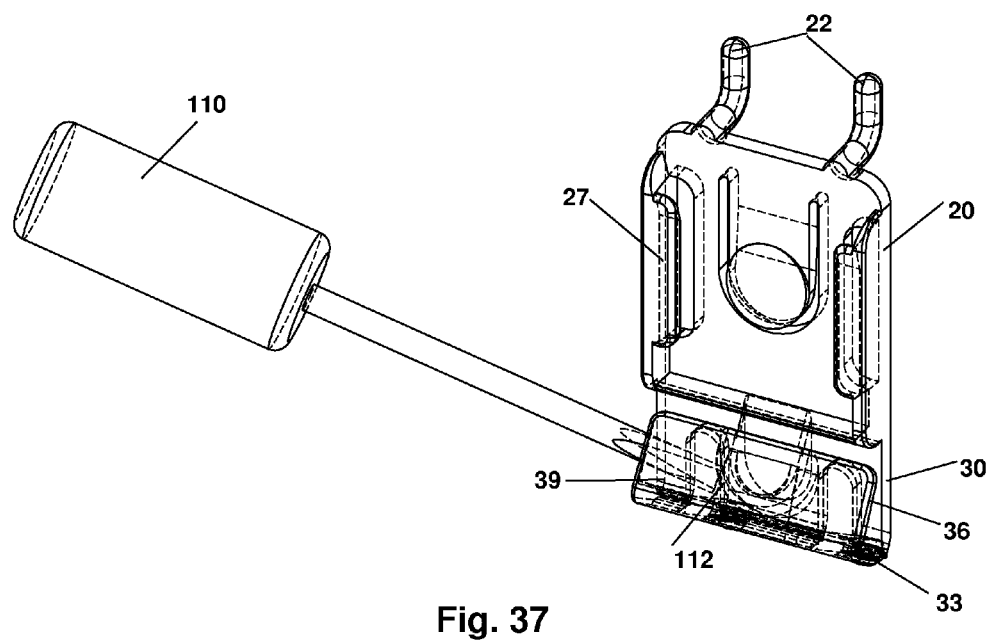
FIG. 37 shows a tool being used to open a closed hinge of the connector piece, in embodiments of the disclosed technology.

FIG. 37 shows a tool being used to open a closed hinge of the connector piece, in embodiments of the disclosed technology. The tool 110, such as a screwdriver, pliers, letter opener, or other device having an elongated rigid member 37, is placed in the triangle 39 created by the locked portion of the hinge 36 and the elongated length side of the connector 20 (the side which abuts the slat board or peg board and has hooks 22 extending there-from, the hooks 22 adapted for placement into a slat or peg of a respective such board. A tool, such as tool 110, is required, in embodiments of the disclosed technology, to disconnect the male and female engaged and fixedly connected portions of the living hinge. "Fixedly connected" is defined as "requiring a tool in order to create enough torque to disconnect the engaged parts without damage to the engaged parts." Further, an average person cannot disengage engaged parts, as defined in this disclosure, with the use of bare hands.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described herein above are also contemplated and within the scope of the invention.

The invention claimed is:

1. A connector comprising:
a first pair of fixed positioned spaced-apart prongs extending substantially transverse to a generally planar surface of said connector;
a living hinge having at least two positions:
a first position, where a second pair of spaced-apart prongs is substantially co-planar with said generally planar surface;
a second position, where said second pair of spaced-apart prongs extends substantially transverse to said generally planar surface
a male portion of an affixable connector on a first side of said living hinge;
a female portion of an affixable connector on a second side of said living hinge;
wherein, in said second position, said male portion and said female portion are affixed to each other.

2. The connector of claim 1, wherein said first pair of fixed positioned spaced-apart prongs further comprises a portion thereof, which extends parallel to said generally planar surface of said connector, and wherein said portion thereof forms a unitary structure with said substantially transverse portion of said first pair of prongs.

3. The connector of claim 1, wherein said connector further comprises a depressible button which, in a resting position, extends past said generally planar surface of said connector.

4. The connector of claim 3, wherein said connector further comprises flanges on either side of said connector and said depressible button fixedly positioned in a position spaced apart from said generally planar surface of said connector.

5. The connector of claim 4, further comprising a connecting arm with a portal sized to receive said depressible button there-in, wherein, upon said depressible button engaging with said portal, a generally planar portion of said connecting arm is positioned between each said flange of said flanges on either side of said connector and said generally planar surface of said connector.

6. The connector of claim 1, wherein said affixed male portion and said female portion require the use of a tool beyond bare hands of an average person, in order to disconnect said male portion and said female portion from each other.

7. The connector of claim 1, wherein, in said second position, each prong of said first pair of spaced-apart prongs and said second pair of spaced-apart prongs are fixed in position in a slat board or peg board.

8. A connector comprising:
a hinge bisecting two parts of said connector which are connected by said hinge, each of said two parts fixedly connectable to each other by way of a second connection formed by rotating said hinge until each of said two parts connect to one another, forming a triangle; and
spaced-apart first prongs fixedly attached to one part of said two parts of said connector which rotate with said rotating of said hinge; wherein
said spaced-apart first prongs are movable, by way of said movement of said hinge, between a position which is flush with each of said two parts of said connector and a position which is perpendicular to at least one part of said two parts of said connector.

9. The connector of claim 8, wherein a tool is required to disconnect said second connection.

10. The connector of claim 8, wherein said connector further comprises a second set of prongs on said connector attached to said connector at an opposite side of said hinge from said first prongs.

11. The connector of claim 8, wherein each of said first and second prongs is engaged with slat board or peg board and fixedly held there-in until after said hinge of said second connection is broken.

12. The connector of claim 8, wherein said hinge is a living hinge repeatedly bendable between an unbent and an at least 90 degree bent condition.

13. A method of using a connector comprising the steps of:
  inserting at least two spaced-apart prongs into a slat board or a peg board;
  depressing a portion of said connector towards itself, causing extreme ends of at least two additional spaced-apart prongs to rotate away from said connector;
  inserting said at least two additional spaced-apart prongs into said slat board or said peg board;
  fixedly attaching two portions of said connector to one another, forcing said at least two additional spaced-apart prongs to be held in position rotated away from said connector and in said slat board or said peg board
  sliding a connecting arm between a generally flat side of said connector and flanges spaced apart from said connector, wherein said generally flat side of said connector abuts said slat board or said peg board.

14. The method of claim 13, wherein said step of depressing involves rotating a living hinge, causing a portion of said connector which was planar with said generally flat side of said connector to be at an acute angle there-to.

15. The method of claim 14, further comprising a step of inserting an elongated length of rigid material between a portion of said connector extending at an acute angle to a generally flat side of said connector; and
  detaching said two portions of said connector from one another.

16. The method of claim 15, wherein said elongated length of rigid material is inserted into said triangle formed when said second connection is formed.

* * * * *